United States Patent
Anand et al.

(10) Patent No.: US 11,349,873 B2
(45) Date of Patent: May 31, 2022

(54) USER MODEL-BASED DATA LOSS PREVENTION

(71) Applicant: ArmorBlox, Inc., Sunnyvale, CA (US)

(72) Inventors: Chetan Anand, Mountain View, CA (US); Arjun Sambamoorthy, Mountain View, CA (US); Anand Raghavan, Cupertino, CA (US); Dhananjay Sampath, Sunnyvale, CA (US)

(73) Assignee: ArmorBlox, Inc., Sunnyvale, CA (US)

( * ) Notice: Subject to any disclaimer, the term of this patent is extended or adjusted under 35 U.S.C. 154(b) by 168 days.

(21) Appl. No.: 16/201,964

(22) Filed: Nov. 27, 2018

(65) Prior Publication Data

US 2019/0166161 A1 May 30, 2019

Related U.S. Application Data

(60) Provisional application No. 62/591,150, filed on Nov. 27, 2017.

(51) Int. Cl.
| | |
|---|---|
| *H04L 29/06* | (2006.01) |
| *H04L 9/40* | (2022.01) |
| *H04L 67/10* | (2022.01) |
| *G06F 16/27* | (2019.01) |
| *G06N 20/00* | (2019.01) |
| *H04L 51/046* | (2022.01) |

(Continued)

(52) U.S. Cl.
CPC .............. *H04L 63/20* (2013.01); *G06F 16/27* (2019.01); *G06N 20/00* (2019.01); *H04L 51/046* (2013.01); *H04L 51/12* (2013.01); *H04L 63/102* (2013.01); *H04L 63/123* (2013.01); *H04L 63/126* (2013.01); *H04L 67/10* (2013.01); *H04L 63/168* (2013.01); *H04L 67/02* (2013.01); *H04L 2209/38* (2013.01)

(58) Field of Classification Search
CPC ..... H04L 63/20; H04L 63/102; H04L 63/123; H04L 63/108; G06F 21/552
USPC ............................................................. 726/1
See application file for complete search history.

(56) References Cited

U.S. PATENT DOCUMENTS

| | | | |
|---|---|---|---|
| 8,145,562 B2 * | 3/2012 | Wasserblat | G06Q 40/00 705/38 |
| 9,641,544 B1 | 5/2017 | Treat et al. | |
| 9,774,626 B1 * | 9/2017 | Himler | H04L 63/1433 |

(Continued)

OTHER PUBLICATIONS

PCT International Search Report and Written Opinion, PCT Application No. PCT/US 18/62668, dated Feb. 12, 2019, fifteen pages.

(Continued)

*Primary Examiner* — Longbit Chai

(57) ABSTRACT

A cloud security service provides network security. The cloud security service receives, via a computer network, an electronic message sent by a sending user of an enterprise to a receiving user. The cloud security service analyzes the electronic message using a machine-learned user model describing the sending user's electronic messages, the user model generated based at least in part on previous electronic messages sent by the sending user. The cloud security service determines, based on the analysis, that the electronic message violates a security policy of the enterprise. The cloud security service performs a security action based on the determination that the electronic message violates the security policy.

17 Claims, 7 Drawing Sheets

(51) Int. Cl.
*H04L 51/00* (2022.01)
*H04L 67/02* (2022.01)

(56) References Cited

U.S. PATENT DOCUMENTS

| | | |
|---|---|---|
| 9,882,918 B1 | 1/2018 | Ford et al. |
| 10,091,180 B1 | 10/2018 | Moritz et al. |
| 10,412,074 B2 * | 9/2019 | Zhang .................... H04L 63/08 |
| 10,721,274 B1 | 7/2020 | Prasad |
| 10,956,847 B2 | 3/2021 | Fu |
| 2007/0079379 A1 | 4/2007 | Sprosts et al. |
| 2007/0282955 A1 | 12/2007 | Lin et al. |
| 2015/0156208 A1 | 6/2015 | Kirkham et al. |
| 2017/0111175 A1 | 4/2017 | Oberhauser et al. |
| 2017/0173262 A1 * | 6/2017 | Veltz .................... A61B 5/0022 |
| 2017/0286671 A1 | 10/2017 | Chari et al. |
| 2017/0359288 A1 | 12/2017 | Golan |
| 2018/0005235 A1 | 1/2018 | Thorne |
| 2018/0025140 A1 | 1/2018 | Edelman et al. |
| 2018/0034755 A1 | 2/2018 | Saoji et al. |
| 2018/0097790 A1 | 4/2018 | Caldera et al. |
| 2018/0097841 A1 | 4/2018 | Stolarz et al. |
| 2018/0124047 A1 | 5/2018 | Fisher et al. |
| 2018/0165758 A1 | 6/2018 | Saxena et al. |
| 2019/0012595 A1 | 1/2019 | Beser et al. |
| 2019/0065742 A1 | 2/2019 | Humphries |
| 2019/0098037 A1 | 3/2019 | Shenoy et al. |
| 2019/0109717 A1 | 4/2019 | Reddy et al. |
| 2019/0122258 A1 | 4/2019 | Bramberger et al. |
| 2019/0207975 A1 | 7/2019 | Wardman et al. |
| 2019/0334905 A1 | 10/2019 | Lelcuk et al. |
| 2020/0036515 A1 | 1/2020 | Chari et al. |
| 2020/0076829 A1 | 3/2020 | Wentz |
| 2020/0145447 A1 | 5/2020 | Coffey et al. |

OTHER PUBLICATIONS

United States Office Action, U.S. Appl. No. 16/201,977, filed Apr. 7, 2021, 11 pages.

* cited by examiner

USER MODEL-BASED DATA LOSS PREVENTION

CROSS REFERENCE TO RELATED APPLICATIONS

This application claims the benefit of Provisional Application No. 62/591,150, filed Nov. 27, 2017, which is incorporated herein by reference.

BACKGROUND

1. Field of Art

The present disclosure relates generally to computer security and in particular to enforcing security policies on enterprise network traffic.

2. Description of the Related Art

Businesses, organizations such as universities and charities, and other enterprises have valuable information. Users of the enterprises communicate with one another about the valuable information over networks like the Internet. Malicious actors attempt to access the valuable information using various scams and attacks, such as Business Email Compromise. As such, the enterprises attempt to prevent the malicious actors from accessing the valuable information using security policies that regulate the exchange of valuable information. However, creating and enforcing security policies can be time consuming and difficult. Furthermore, security policies often deprecate quickly due to changes to the enterprise. Enterprises find difficulty in adequately creating and updating security policies that effectively prevent the loss of valuable information over time.

SUMMARY

A cloud security service provides network security to an enterprise. The cloud security service receives, via a computer network, an electronic message sent by a purported sending user of an enterprise to a receiving user of an enterprise.

The cloud security service analyzes the electronic message using a machine-learned user model describing the purported sending user's electronic messages, the user model generated based at least in part on previous electronic messages sent by the sending user. The retrieved user model may describe electronic messages sent by the purported sending user to the receiving user, and may be specific to the sending user and trained using previous electronic messages sent by the purported sending user to the receiving user.

The analysis may include retrieving a user identity that describes a set of prominent features of electronic messages sent by the purported sending user. The cloud security service may apply the electronic message to the user model to produce a set of message features and compare the set of message features produced by the user model to the set of prominent features described by the user identity.

The cloud security service determines, based on the analysis, that the electronic message violates a security policy of the enterprise. The cloud security service performs a security action based on the determination that the electronic message violates the security policy.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

I. System Overview

Figure 1:
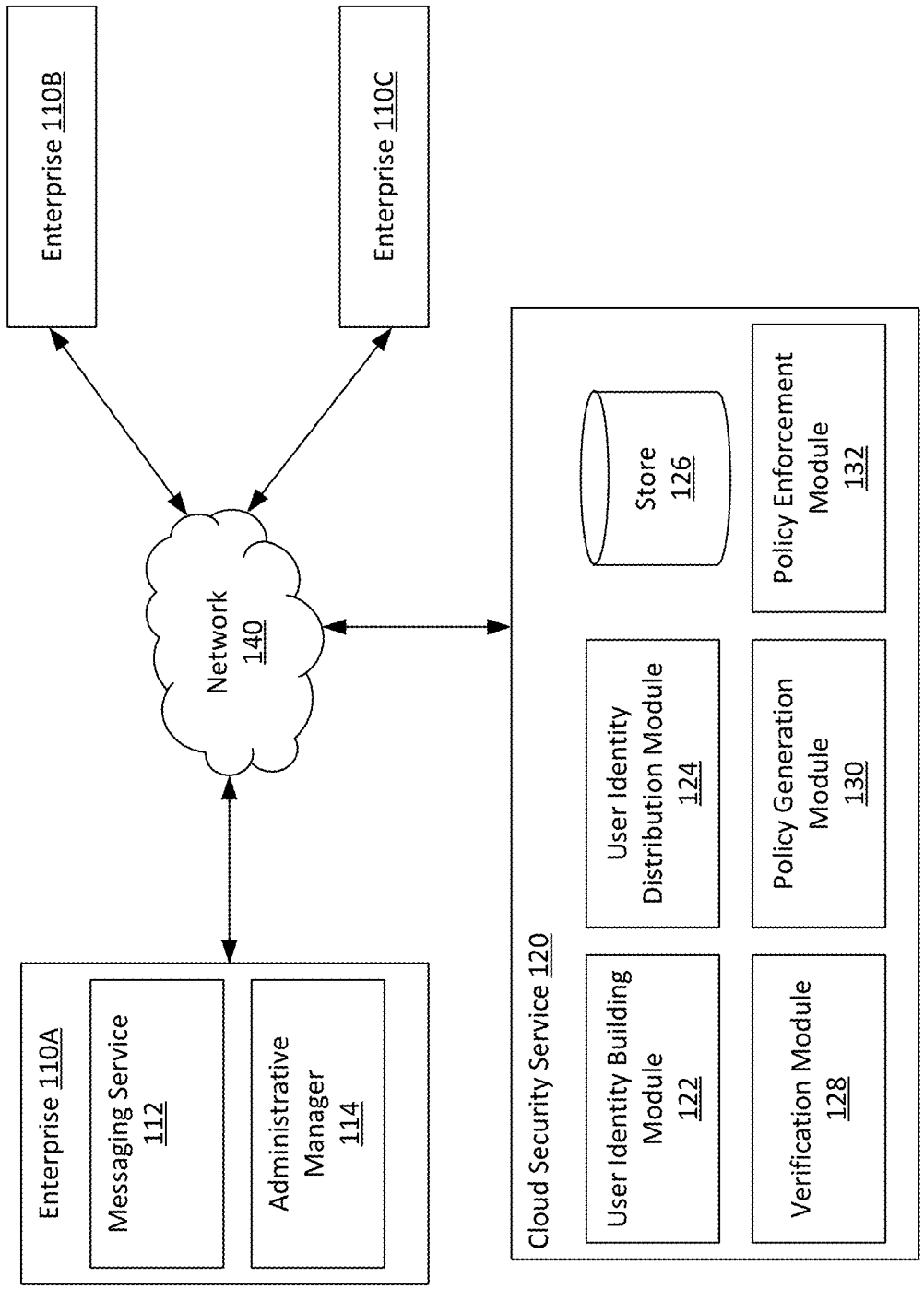
FIG. 1 is a block diagram illustrating a system including a cloud security service, according to one embodiment.

FIG. 1 is a block diagram illustrating a system 100 including a cloud security service 120, according to one embodiment. The system 100 includes a plurality of enterprises 110 and a cloud security service 120 connected via a network 140. In alternative embodiments, the system 100 may include other or additional modules, such as fewer or more enterprises 110.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A," "110B," and/or "110C" in the figures.

Enterprises 110 are businesses, charities, universities, or other organizations. Enterprises 110 include one or more users. Enterprises 110 also include one or more client devices, such as computers or mobile phones, which are used by the users of the enterprise 110. Enterprises 110 typically have valuable information that the enterprises 110 attempt to keep private and that malevolent entities attempt to take. For example, enterprise 110A may be a social networking service with valuable user information such as private photos that malevolent entities may attempt to access by posing as the user. As a second example, enterprise 110B may be a university storing student records or personal information that malevolent entities may attempt to steal using a phishing scam. As such, enterprises 110 may employ various techniques to minimize data loss. At least one enterprise 110 communicates with the cloud security service 120 over the network 140 to employ enterprise 110 data loss prevention via the cloud security service 120.

Enterprise 110A includes a messaging service 112 and an administrative manager 114. The messaging service 112 is one or more communications services with which users of the enterprise 110A may communicate with other users of the enterprise 110A and/or users of other enterprises 110. For example, the messaging service 112 may be one or a plurality of email services, instant messaging services, telephone services, video chat services, and so on, e.g. MICROSOFT OUTLOOK and SLACK. For example, a user of enterprise 110A uses the messaging service 112 to send an email including an attached document to a user at enterprise 110C. The messaging service 112 may send some or all enterprise 110 communications, such as emails, text messages, instant messages, and other electronic messages, as well as attachments to the communications and metadata about the communications, the enterprise 110A, and/or the network 140, to the cloud security service 120. Herein, enterprise 110 communications, text documents and other attachments to the communications, and metadata about the communications are referred to generally as "enterprise messages." Many enterprise messages have a sending user that sends the enterprise message and one or more receiving users to whom the enterprise message is sent. The messaging service 112 may block the sending or receiving of one or more enterprise messages in response to instructions from the cloud security service 120.

In an embodiment, the enterprise 110A uses a security enforcement mechanism to implement one or more security policies to police network traffic and monitor for the sharing of valuable information in enterprise messages by users of the enterprise 110A, thereby minimizing data loss to malevolent entities. The security enforcement mechanism may be provided by the cloud security service 120 to the enterprise 110A or may be implemented by the administrative manager 114. The security enforcement mechanism acts upon the messaging service 112 to control the flow of network traffic, e.g. control which enterprise messages are sent and received by users of the enterprise 110A.

The administrative manager 114 manages the enterprise's 110A data loss prevention techniques and interfaces with the cloud security service 120 to enable and configure the data loss prevention techniques. The administrative manager 114 communicates with the cloud security service 120 over the network 140, such as to send instructions or retrieve data. The administrative manager 114 may generate a user interface exposing an application program interface ("API") of the cloud security service 120 that can be used by an administrator at the enterprise 110 to configure or query the cloud security service 120. For example, the administrative manager 114 may create a security policy or incorporate a new messaging service 112 into the cloud security service 120 via the API.

The administrative manager 114 receives reports from the cloud security service 120, such as reports of security policy violations, and can respond to the reports to instruct the cloud security service 120 in how to address the security policy violations. For example, the administrative manager 114 can respond with an instruction to block the received enterprise message from continuing to its destination, or to allow the received enterprise message to continue to its destination. One or more users of the enterprise 110, such as administrators, may control the administrative manager 114 using client devices. The administrative manager 114 may display the reports and other information at a graphical display of the client device. The administrative manager 114 may also receive security policies for review from the cloud security service 120, and may accept, revise, or deny the security policies.

The network 140 enables communications among the enterprises 110 and the cloud security service 120, as well as among nodes of the cloud security service 120, and can comprise the Internet as well as mobile telephone networks. In one embodiment, the network 140 uses standard communications technologies and/or protocols. The data exchanged over the network 140 can be represented using technologies and/or formats such as the hypertext markup language ("HTML"). The enterprises 110 can use custom and/or dedicated data communications technologies instead of, or in addition to, the ones described above.

The cloud security service 120 operates to provide communications security and security policy management to one or more enterprises 110. The cloud security service 120 builds user models for evaluating enterprise messages for user communication behaviors, as well as user identities that describe user communication behaviors, based on enterprise messages sent by users. In an embodiment, the user models and user identities are used to verify sending users and build security policies, together providing enhanced security to an enterprise 110. By verifying sending users and building security policies, the cloud security service 120 provides data loss prevention to enterprises 110 that would otherwise lose valuable information to malicious actors, e.g. through phishing scams. Additionally, the cloud security service 120 enables more efficient and effective creation and updating of security policies, providing more accurate, configurable, and comprehensive security policy sets to enterprises 110.

The cloud security service 120 includes a user identity building module 122, a user identity distribution module 124, a store 126, a verification module 128, a policy generation module 130, and a policy enforcement module 132. The cloud security service 120 may include one or more distributed applications providing various functionality, including data loss prevention techniques. For example, the cloud security service 120 may provide enterprise message sending user verification, network traffic insights and behavioral analysis, threat scoring on a per-enterprise message basis, real time Business Email Compromise handling, dynamic security policy generation and enforcement, and so on. In an embodiment, some or all modules of the cloud security service 120 are at the enterprise 110 rather than the cloud security service 120.

In an embodiment, the cloud security service 120 is implemented using a containerized microservices architecture distributed across a plurality of nodes. The nodes may employ one or more consensus algorithms, such as Blockchain Consensus Protocol. The nodes may be server computers remote from the enterprises 110. In alternative embodiments, the cloud security service 120 is implemented using other architectures, such as a monolith architecture, or using virtual machines rather than containers.

The user identity building module 122 uses enterprise messages to construct user models and user identities representing users of enterprises 110 based on their communication behaviors. The user identities may be for individual users or for sets of users, such as a sending user/receiving user pair. A user identity for a set of users is specifically based on enterprise messages from the sending user to the one or more receiving users included in the set of users. The user identities can be used to verify whether enterprise communications purporting to be from a sending user are indeed from the sending user, as described below. For clarity, user identities are described herein as pertaining to a sending user, unless expressly stated otherwise. However, the techniques described herein may be applied to sets of users rather than just a sending user.

The user identity building module 122 builds a user identity for a user using enterprise messages from the user and user models trained on the enterprise messages. The user identity building module 122 may build a user identity for some or all users of an enterprise 110. The user identity building module 122 accesses historic enterprise messages from the enterprise 110, such as archived enterprise messages, and sorts the accessed enterprise messages by sending user into enterprise message sets. As such, each sending user is associated with an enterprise message set including enterprise messages sent by the sending user.

The user identity building module 122 analyzes an enterprise message set to extract features representative of user communication behavior for the sending user associated with the enterprise message set. In an embodiment, the analysis includes using natural language processing to extract the features from the enterprise message set. The natural language processing may include named entity recognition, coreference resolution, machine comprehension, semantic role labeling, stylometric analysis, and sentiment analysis. However, in other embodiments, other or additional techniques may be used by the user identity building module 122 to extract features from enterprise messages.

The extracted features may include specific writing patterns, including word usage, typical n-grams, topic clusters, email signatures, use of particular keywords and reserved words, inclusion of particular topics and sentiments, and use of particular person names, enterprise names, or other entity names or indicators, such as titles or acronyms. Other extracted features may include Simple Mail Transfer Protocol headers and other metadata in the enterprise messages. The analysis could further determine features such as typical geolocations from where the sending user sends enterprise messages, typical devices used to send the enterprise messages, typical applications that the sending user uses to send enterprise messages, and messaging patterns such as time of day, day of week, typical response time, typical spelling, grammar, and syntax errors, typical fonts and other text formatting settings, and typical carbon copy and blind carbon copy recipients.

As a particular example of the user identity building module 122 analyzing an enterprise message and extracting features from the enterprise message, the user identity building module 122 analyzes an email with a text document attachment sent by sending user "Jim" to receiving user "Bob." The user identity building module 122 applies various natural language processing techniques to the email and to the text document attached thereto. Based on this analysis, the user identity building module 122 extracts named entities "Jim" and "Bob," identifies a phrase "the document" in the email as pertaining to the text document attachment, and identifies a phrase "confidential" as pertaining to the document. Furthermore, the analysis of the document extracts a set of topics, such as "Project Orion."

The user identity building module 122 uses the extracted features from the enterprise message set to construct one or more user models that select features for the sending user. For example, each user model may be constructed for a different feature, such as one user model for a certain writing pattern and a second user model for a typical email signature. Based on the user models, the user identity building module 122 may identify prominent features for the sending user. Prominent features of a user are features most representative or distinctive of the user's communication behavior, e.g. features for which the sending user's feature value is at least a threshold amount different from an average value for the feature. In an embodiment, the user models are machine learning models that use the extracted features as training data, and the weights of the trained machine learning models are the feature values describing the user's communications. The user identity building module 122 uses the trained user models to generate a set of feature values for the set of prominent features (a "set of prominent feature values") of the sending user. For example, the weights of each trained user model may be combined into a set of prominent feature values. In an embodiment, one or more user models are common to multiple enterprises, such as all enterprises connected to the cloud security service 120, while one or more other user models are specific to an enterprise.

For example, a certain user's associated enterprise message set is analyzed by the user identity building module 122 using natural language processing techniques to extract a set of features. The user identity building module 122 trains a machine-learning user model on the extracted set of features to identify a subset of prominent features that best represent or distinguish the certain user from other users. The user identity building module 122 uses the user model to generate a set of prominent feature values for the certain user. This may entail training the user model on each enterprise message in the enterprise message set and extracting feature weights from the trained user model.

User models may also be constructed on a sending user/receiving user pair basis. For example, the enterprise message set may be further partitioned based on receiving user, and each partition may be modeled to identify per-receiving-user features. For example, one feature may be that the sending user typically mentions "Project Orion" in instant messages to receiving user "Bobby B."

The user identity building module 122 sends the set of prominent feature values to the user identity distribution module 124 for incorporation into a user identity and subsequent storage. The user identity building module 122 may also send one or more user models, e.g. user models specific to the enterprise of the sending user, to the user identity distribution module 124 with the set of prominent feature values, or may store the user models at the store 126.

The user identity distribution module 124 turns sets of prominent feature values into user identities and stores the user identities such that they may be accessed and used by other components of the cloud security service 120. Upon receiving a set of prominent feature values for a user, the user identity distribution module 124 applies a feature map to the set of prominent feature values to transform it into a user identity summarizing the set of prominent feature values. The feature map is a function that maps the set of prominent feature values from one space to another, such as a privacy-preserving one-way hash that obfuscates the set of prominent feature values. For example, the feature map may be a homomorphic encryption technique, such as a zero-knowledge proof like ZK-STARK or ZK-SNARK. The user identity distribution module 124 may generate the feature map for the set of prominent feature values based on which features are included in the set of prominent feature values. Furthermore, the feature map may be set for a particular level of obfuscation. As such, each user identity may be associated with a different feature map.

The user identity distribution module 124 stores the user identity and the feature map as well as one or more user models in some embodiments, at the store 126. In an embodiment, the user identity distribution module 124 stores a non-feature mapped version of a user identity at a private ledger of the enterprise 110 associated with the user, and a feature mapped version of the user identity at a "shared ledger," as described below.

The store 126 stores data such as security policies, user models, and user identities. Depending upon the embodiment the store 126 may be any of a variety of types of stores, and may include one or more stores at the cloud security service 120 and/or one or more external locations. For example, one aspect of the store 126 may be a relational or non-relational database upon the cloud security service 120 that stores per-enterprise 110 data such as security policies. In various embodiments, the store 126 may additionally comprise one or more distributed ledgers, such as blockchains. The store 126 may include one or more interfaces to the one or more distributed ledgers used to access the distributed ledgers. In an embodiment, the one or more distributed ledgers are distributed among the nodes of the cloud security service 120.

In an embodiment, the store 126 comprises a private ledger for each enterprise 110 as well as a shared ledger, which is a distributed ledger shared among the enterprises 110 connected to the cloud security service 120. The private ledgers may be permissioned sidechains to the shared ledger, which may also be permissioned. In some embodiments, some or all of the ledgers are instead public. Cloud security service 120 services, such as the verification module 128, can be built to use data solely from an enterprise's private ledger, solely from the shared ledger, or from both the enterprise's private ledger and the shared ledger.

The verification module 128 enables an enterprise 110 to validate the identity of a purported sending user of an enterprise message from outside the enterprise 110 using the purported sending user's user identity, and is described below with reference to FIG. 2. The policy generation module 130 generates security policies for an enterprise 110, and is described below with reference to FIG. 3. The policy enforcement module 132 enforces security policies for an enterprise 110, and is described below with reference to FIG. 4. Together, the verification module 128, the policy generation module 130, and the policy enforcement module 132 provide data loss prevention to an enterprise 110 via increased enterprise 110 control over, and analysis of, network traffic into and out of the enterprise 110.

Figure 2:
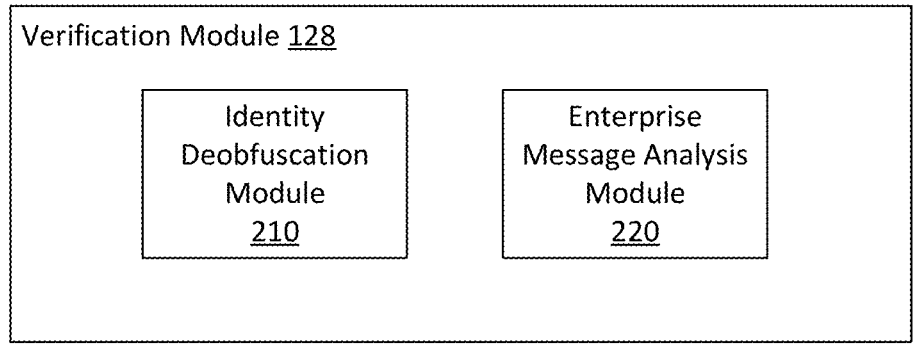
FIG. 2 is a block diagram illustrating a verification module of a cloud security service, according to one embodiment.

FIG. 2 is a block diagram illustrating the verification module 128 of the cloud security service 120, according to one embodiment. The verification module 128 enables an enterprise 110 to validate purported sending users of enterprise messages using user models and user identities. For example, a first user at enterprise 110A may send a second user at enterprise 110C an enterprise message. The verification module 128 may verify that the first user is a member of enterprise 110A using the first user's user model and user identity, and inform the second user that the enterprise message is legitimately from the first user. The verification module 128 includes an identity deobfuscation module 210 and an enterprise message analysis module 220.

The identity deobfuscation module 210 retrieves user identities and feature maps such that the user identities may be used for purposes such as verifying a purported sending user of an enterprise message as the sending user in actuality, rather than a malicious entity posing as the sending user. The identity deobfuscation module 210 identifies the purported sending user of the enterprise message. Depending upon the embodiment, this may be done using one or more techniques. For example, the identity deobfuscation module 210 may identify the purported sending user using a header of the enterprise message, metadata of the enterprise message, a name included in the enterprise message such as at a signature portion, or a distinct identifier included in the enterprise message, such as a telephone number. As a particular example, if the enterprise message is an email, the purported sending user may be identified from the content of the "from:" section of the email. As a second particular example, if the enterprise message includes a telephone number or is from a telephone number, the identity deobfuscation module 210 may look up the telephone number, e.g. at the store 126, for a user associated with the telephone number. The identity deobfuscation module 210 may identify the purported sending user based on the natural language processing analysis performed by the user identity building module 122. For example, if the analysis identifies a signature portion of the enterprise message, the identity deobfuscation module 210 may identify the purported sending user as the user with the name included at the signature portion.

After identifying the purported sending user, the identity deobfuscation module 210 retrieves the user identity and an associated feature map of the purported sending user from the store 126, as well as zero or more user models particular to the sending user's enterprise 110. If the purported sending user is a member of the enterprise 110, the identity deobfuscation module 210 retrieves the user's non-feature mapped user identity from the enterprise's private ledger. If the purported sending user is external to the enterprise, the identity deobfuscation module 210 retrieves the purported sending user's (feature mapped/obfuscated) user identity from the shared ledger. If the user identity is retrieved from the shared ledger, the identity deobfuscation module 210 also retrieves the feature map (i.e., the obfuscation function) corresponding to the user identity.

The identity deobfuscation module 210 sends the user identity and the feature map to the enterprise message analysis module 220 for use in verifying the purported sending user of an enterprise message. In an embodiment, the identity deobfuscation module 210 also sends the enterprise message and/or one or more user models corresponding to the user identity to the enterprise message analysis module 220.

The enterprise message analysis module 220 performs verification of the enterprise message based on analysis of the enterprise message as compared to the retrieved user identity of the sending user received from the identity deobfuscation module 210. The enterprise message analysis module 220 evaluates the enterprise message using one or more common user models as well as any user models stored in association with the user identity of the purported sending user, which the enterprise message analysis module 220 either receives from the identity deobfuscation module 210 or retrieves from the store 126. The user models, upon evaluating the enterprise message, outputs a set of prominent feature values. The enterprise message analysis module 220 then passes the output set of prominent feature values through the feature map and compares the result to the user identity. The user identity represents user communication behaviors of the real user that the purported sending user purports to be, anonymized by the feature map. The output set of prominent feature values represents user communication behaviors of the purported sending user, anonymized by the same feature map. By comparing the user communication behaviors of the real user (as represented by the user identity) to the user communication behaviors of the purported sending user (as represented by the output set of prominent feature values), the enterprise message analysis module 220 can determine a similarity between the two, and thereby gauge a likelihood that the purported sending user is in fact (or is in fact not) the real user.

If the set of prominent feature values and user identity are within a threshold similarity of one another, the enterprise message analysis module 220 verifies the enterprise message as being from the purported sending user, whereas if the set of prominent feature values and identity are not within a threshold similarity of one another, the enterprise message analysis module 220 does not verify the enterprise message and performs one or more security actions, such as reporting the enterprise message to the administrative manager 114.

The threshold may be set by the administrative manager 114 or the cloud security service 120, depending upon the embodiment. For example, the cloud security service 120 may determine an average difference between a user's user identity and an output set of prominent feature values for enterprise messages sent by the user and evaluated using the user's user model. The cloud security service 120 may base the threshold on the average difference, e.g. the threshold may be the average difference, or a fraction or multiple of the average difference.

The security action performed by the enterprise message analysis module 220 in response to determining that the sender of an enterprise message is not verifiable as the purported sending user may vary depending upon the embodiment. The security action may comprise reporting the enterprise message to the administrative manager 114, and/or quarantining, blocking, or deleting the enterprise message. Alternatively or additionally, the security action may comprise changing a subject line or other part of the enterprise message to indicate that the enterprise message was not verified, and sending the changed enterprise message to the intended receiving user. In an embodiment, the security action is indicating to the sending user that the receiving user may not be the correct receiving user, such as when analysis of a new enterprise message indicates the sending user typically sends enterprise messages to receiving user "Bobby B" but the new enterprise message is addressed to "Bobby V."

If the enterprise message analysis module 220 receives an administrative response from the administrative manager 114 in response to reporting an enterprise message, the enterprise message analysis module 220 acts based on the administrative response. The enterprise message analysis module 220 may block or allow the enterprise message based on instructions included in the administrative response.

By performing verification of sending users of enterprise messages, the verification module 128 allows an enterprise 110 to better ensure that its data is protected from malevolent entities attempting to access the data without permission by posing as the sending user. When enterprise messages are determined to not be from the purported sending user, the cloud security service 120 enables the enterprise 110 to perform security actions to respond to the attempted breach. Furthermore, because the cloud security service 120 creates user models and user identities for each enterprise 110 connected to the cloud security service 120, an enterprise 110A can verify purported sending users from outside the enterprise 110A, e.g. purported sending users from enterprises 110B and 110C, even though the enterprise 110A may not have prior communications with the purported sending user. By identifying purported sending users that are in fact malevolent entities posing as the sending user, the verification module 128 enables an enterprise 110 to ensure its users don't send valuable information to the malevolent entity in response to the enterprise message sent by the malevolent entity.

Figure 3:
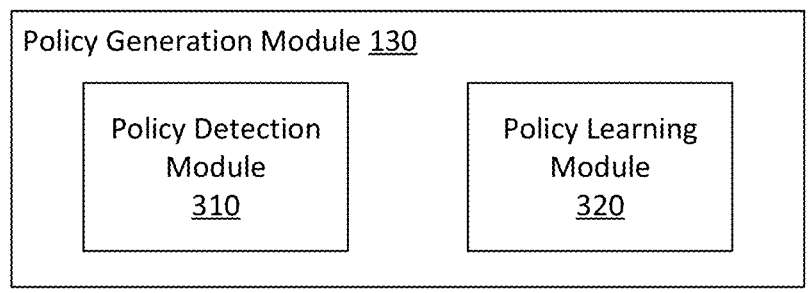
FIG. 3 is a block diagram illustrating a security policy generation module of a cloud security service, according to one embodiment.

FIG. 3 is a block diagram illustrating the security policy generation module 130 of the cloud security service 120, according to one embodiment. The policy generation module 130 creates security policies ("policies") for enterprises 110 via one or more techniques. Policies are constraints upon enterprise 110 communications, such as limits upon who can send enterprise messages that include particular content. Policies include one or more rules describing the constraints of the policy based on one or more policy parameters, such as keywords and users. Policy parameters are components of enterprise messages used in policy rules, such as keywords and sets of users exclusively allowed to include the keywords in enterprise messages. Depending upon the embodiment, there may be various types of policy parameters, such as different types of keywords, attachments, and users. Policy parameters may be determined based on analysis, e.g. natural language processing, of enterprise messages, such as topics and sentiments. The policy generation module 130 includes a policy detection module 310 and a policy learning module 320. The policy detection module 310 performs explicit policy generation and the policy learning module 320 performs implicit policy generation.

Policies may be created dynamically, either explicitly based on triggers within an enterprise message, or implicitly based on analysis of enterprise messages. Depending upon the embodiment, the policy generation module 130 may perform implicit policy generation, explicit policy generation, or both. Policies created by the policy generation module 130 may be stored in the store 126. Administrators of the enterprise 110 that use the administrative manager 114 may interact with the policy generation module 130 via the user interface at the administrative manager 114. Different enterprises 110 may have different policies. For example, enterprise 110A may have a first set of policies and enterprise 110B may have a second set of policies differing from the first set of policies. Policies may be user specific or specific to sets of users, in some embodiments.

The policy detection module 310 performs one or more explicit policy generation techniques, depending upon the embodiment. In a first technique, the policy detection module 310 generates a new policy based on instructions received from the administrative manager 114. For example, the user may directly send the policy detection module 310 an instruction including one or more rules for a new policy. Upon receipt, the policy detection module 310 generates a new policy using the one or more rules.

In a second technique, the policy detection module 310 initiates generation of a new policy based off one or more triggers within an enterprise message by detecting the trigger and sending the enterprise message to the policy learning module 320 for policy generation. Triggers are aspects of an enterprise message that, if included in the enterprise message, inform the cloud security service 120 to generate a new policy. Triggers may be text strings such as keywords or other aspects of enterprise messages and/or addresses to which the messages were sent. For example, the cloud security service 120 may be configured such that if a user sends an enterprise message copying a particular policy definition email address, then the policy detection module 310 receives the enterprise message at that address and generates a new policy based on the contents of the enterprise message. In general, the trigger may be a policy definition address specific to the enterprise 110 such that inclusion of the policy definition address as a recipient of the enterprise message indicates to the policy detection module 310 that a policy is to be generated based on the enterprise message. An email address is one example of a policy definition address.

As a second example of the second technique, the trigger could be a keyword beginning with a special character, such as "#policy" included in the enterprise message. The cloud security service 120 detects whether the keyword is present in an enterprise message, and if so, generates a new policy based on the contents of the enterprise message. In an embodiment, the policy detection module 310 analyzes each enterprise message for a trigger. If the policy detection module 310 detects a trigger in the enterprise message, it instructs the policy learning module 320 to determine the rules for the policy based on analysis of the enterprise message, as described below.

The policy learning module 320 generates policies based on analysis of enterprise messages, such as upon detection of a trigger. The policy learning module 320 analyzes the contents of enterprise messages and generates one or more policies based on the contents. For example, the policy learning module 320 may use the natural language processing performed by the user identity building module 122 to identify policy parameters and then derive rules based on the policy parameters. As a particular example, if an email is from a sending user and to four receiving users and includes keywords "New," "confidential," and "Project Orion," the policy learning module 320 may generate a policy including a rule that only the sending user and the four receiving users may send enterprise messages including the keyword "Project Orion." In this particular example, the policy parameters are the sending user, the four receiving users, and the keywords "New," "confidential," and "Project Orion."

The policy learning module 320 may base generated rules on one or more policy templates each associated with particular types of policy parameters, such that the policy learning module 320 generates a policy for an enterprise message if it includes policy parameters matching to the template. In an embodiment, the policy learning module 320 includes and/or generates one or more policy models to generate policies based on policy parameters, e.g. policy parameters extracted from enterprise messages. For example, the policy models may be machine learning models trained on an enterprise's existing policies and/or its historic enterprise messages. The policy learning module 320 may store the templates and/or policy models in the store 126. The models may be specific to particular enterprises 110 and may be updated based on whether or not an implicitly generated policy is implemented or not, e.g. whether an administrator accepts the new policy, as detailed below.

As mentioned above, in one embodiment, the policy detection module 310 sends the policy learning module 320 an enterprise message that explicitly indicates via a trigger that a policy should be crafted based on the enterprise message. Alternatively, the policy learning module 320 may analyze enterprise messages and implicitly generate a policy (or not) based on the analysis. For example, the policy learning module 320 may determine whether the enterprise message includes policy parameters of types corresponding to a template, and/or whether a policy model generates a policy based on the policy parameters. If so, the policy learning module 320 recommends a policy, otherwise it does not.

For example, an enterprise message including "confidential" and "Project X" may be analyzed by the policy learning module 320. The policy learning module 320 may determine based on the analysis that there is a new project, Project X, and that it is confidential. The policy learning module 320 may then generate a policy for Project X restricting the sending of enterprise messages regarding Project X to only the sending user and the one or more receiving users of the enterprise message. This may be based on a policy template or a policy model.

The policy learning module 320 may generate policy signatures associated with policies. A policy signature is a representation of enterprise message content that is covered by a policy. A policy's signature may be used to determine whether a new enterprise message conforms with (or violates) that policy. A policy's signature may be constructed when the policy learning module 320 analyzes an enterprise message. The policy learning module 320 extracts entities, topics, sentiments, and/or other policy parameters determined using the natural language processing described above. The policy learning module 320 determines counts of these policy parameters indicating a number of times the policy parameter occurs within the enterprise message. The policy learning module 320 combines the policy parameters and their counts into a policy signature associated with a policy built based on the enterprise message.

As a particular example of a policy signature, an email may have a text document attachment that includes entities Enterprise 110B and Enterprise 110C, as well as topics Project Orion, "outer space," "stars," "the moon," and "satellite." The signature may then store key/value pairs indicating each entity and topic and a number of times the entity or topic occurs in the text document. The policy learning module 320 may obfuscate the signature, e.g. using a feature map, and may store the signature at the store 126. Depending upon the embodiment, policy parameter counts in a policy signature may or may not be normalized.

In an embodiment, policy signatures are topic-based hashes. A topic-based hash is a policy signature based on entities extracted from an enterprise message by the policy learning module 320 using named entity recognition techniques. For example, a policy signature may include two dozen entities extracted from a SLACK message and an attachment to the message. The attachment to the message may include several paragraphs of text, from which entities, including topics, are extracted. As described below, using the topic-based hash, the cloud security system 120 can check whether a user copied a paragraph from the attachment, even if a few words have changed, using the topic-based hash, as the topic-based hash represents the topics (and/or other entities) in the enterprise message and attachment, rather than just the text.

In an embodiment, the policy generation module 130 sends a new policy to the administrative manager 114 for review before implementing the new policy. If the policy generation module 130 receives an administrative response that the new policy is accepted, the policy generation module 130 implements the new policy for the enterprise 110. If the policy generation module 130 receives an administrative response with an edited new policy, it implements the edited version of the new policy. If the policy generation module receives an administrative response that the new policy should not be implemented, it does not implement the new policy.

Figure 4:
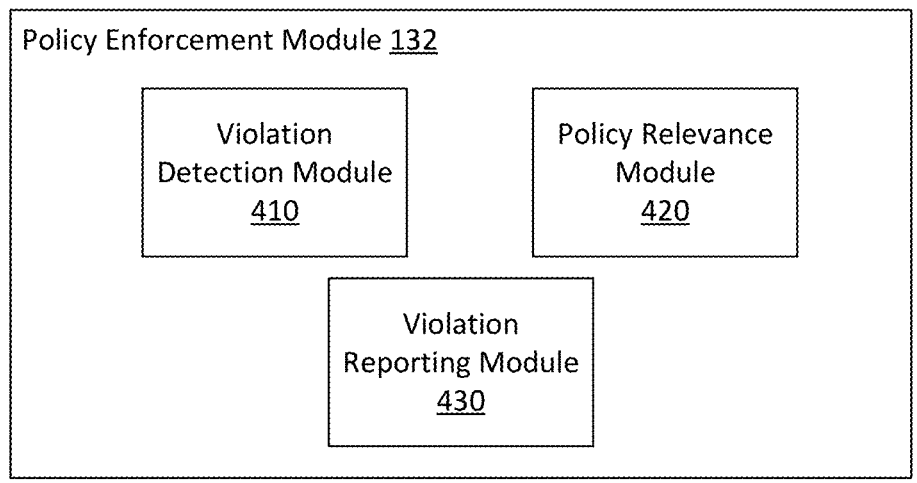
FIG. 4 is a block diagram illustrating a security policy enforcement module of a cloud security service, according to one embodiment.

FIG. 4 is a block diagram illustrating a policy enforcement module 132 of a cloud security service, according to one embodiment. The policy enforcement module 132 enforces enterprise 110 policies created with the policy generation module 130, which may involve performing security actions in response to violations of policies by enterprise messages. The policy enforcement module 132 includes a violation detection module 410, a policy relevance module 420, and a violation reporting module 430. The violation detection module 410 detects violations of policies by users. The policy relevance module 420 scores violations to determine whether to surface the violation to the administrative manager 114.

The violation detection module 410 may employ analysis techniques similar to those described above, such as the application of the sending user's model to the enterprise message. In some embodiments, the analysis further includes natural language processing. In an embodiment, some or all of the user identity building module 122, the verification module 128, the policy generation module 130, and the policy enforcement module 132 perform analysis simultaneously upon an enterprise message, and/or use the same natural language processing.

To detect whether a policy of an enterprise 110 is violated by an enterprise message, the violation detection module 410 checks whether any of the enterprises' policies were explicitly broken by the enterprise message. Violation of a policy by an enterprise message includes at least one of explicit policy violation, where the enterprise message breaks a rule of a policy, signature violation, where a signature of a policy has at least a threshold similarity to a signature of the enterprise message, and abnormal activity by the purported sending user of the enterprise message, as determined using the purported sending user's user identity, or as determined based on detection of a physical impossibility. For clarity, explicit policy violations, signature violations, and abnormal activity are together referred to herein as "violations" unless expressly stated otherwise. In an embodiment, the violation detection module 410 sends an enterprise message to the verification module 128 for verification and detects a violation by the enterprise message if the sending user of the enterprise message is not verified by the verification module 128 using the purported sending user's user model and user identity.

For example, a violation could include a sending user sending an enterprise message to a receiving user including data, e.g. a keyword, that the receiving user is not authorized to receive per a rule of a policy of the sending user's enterprise 110. As a second example, a violation could include deviations from typical features of a purported sending user's enterprise messages. For example, if a sending user typically sends enterprise messages between 9:00 AM and 5:00 PM, and a new enterprise message is sent at 2:00 AM, the violation detection module 410 may identify the new enterprise message as activity violation using the sending user's user model and user identity, as described above with reference to the verification module 128. As a particular example of a physical impossibility, if the violation detection module 410 determines that the enterprise message is sent from Europe two minutes after the sending user sent a previous enterprise message from the United States, the violation detection module 410 may identify the enterprise message as a violation. Upon detecting that an enterprise message causes a violation, the violation detection module 410 sends the enterprise message to the policy relevance module 320 for scoring.

The violation detection module 410 checks enterprise messages for signature violations. The violation detection module 410 generates a signature for an enterprise message and obfuscates the generated signature using the feature map associated with a policy's signature. The violation detection module then compares the signature to the signature of the policy. The violation detection module 410 may do this for a plurality of policies.

If the enterprise message's signature is within a threshold similarity of the policy's signature, the violation detection module 410 determines that the enterprise message has a violation. For example, if the enterprise message signature includes at least a threshold number of topics included in the policy's signature, the enterprise message has a signature violation. Alternatively, if the enterprise message signature has counts for one or more policy parameters within a threshold amount of the counts for the one or more policy parameters in the policy's signature, the enterprise message has a signature violation.

The policy relevance module 420 scores enterprise messages to indicate a significance or severity of the enterprise message's violations. The score may be based on the data included in the enterprise message and/or on the particular violations by the enterprise message. Some policies may be associated with greater scores than others, so enterprise message scores may vary depending upon the particular violated policies. In an embodiment, the score is a composite score based on one or more other scores, such as a user risk score, a magnitude score, and a signature score. The user risk score may represent an inherent risk associated with the sending user and/or one or more receiving users. The user risk score may be based on a difference between the sending user's identity and a set of features extracted from the enterprise message using the user's model, which may be retrieved from the analysis performed by the verification module 128. Each policy may be associated with a severity and type, and the magnitude score for violations of the policy may be determined based on the severity and type. The signature score may be based on a similarity of an enterprise message's signature to the signature of one or more policies.

The policy relevance module 420 may base the score on a number of violations. For example, an enterprise message sent by an unrecognized device but which employs a writing pattern very similar to that of the sending user as recorded in the store 126 may not be scored as suspiciously as an enterprise message sent by an unrecognized device that also employs a different writing pattern and is sent at an unusual time of day. Different violations may be weighted differently by the policy relevance module 420. Upon determining a score for an enterprise message, the policy relevance module 420 sends the score to the violation reporting module 430.

The violation reporting module 430 performs security actions, such as allowing an enterprise message to send or be received by a receiving user, blocking the enterprise message from sending or being received by a receiving user, or reporting the enterprise message to the administrative manager 114, and acting in response to administrative responses. The security action is based on the score for the enterprise message as determined by the policy relevance module 420 as compared to one or more thresholds. In an embodiment, if the score is below a threshold score, the violation reporting module 430 does not report the enterprise message and allows it to send or be received by a receiving user, while if the score is above the threshold score, the violation reporting module 430 blocks the enterprise message. In an embodiment, the violation reporting module 430 additionally sends an alert to the administrative manager 114 to review the enterprise message. Based on instructions received from the administrative manager 114 in response to the alert, the violation reporting module 430 either allows or blocks the enterprise message.

In other embodiments, the violation reporting module 430 may additionally coordinate with the policy generation module 130 to update one or more policies, generate a new policy, or recommend an update to a policy or the generation of a new policy, based on the enterprise message, its violations, and/or an administrative response received from the administrative manager 114. For example, if the administrative response instructs that the receiving user is allowed to receive the enterprise message, the violation reporting module 430 may recommend to the administrative manager 114 that the receiving user be added to the policy as a valid recipient, and may implement changes based on an additional response from the administrative manager 114, such as adding the user to the policy or not.

II. Processes

Figure 5:
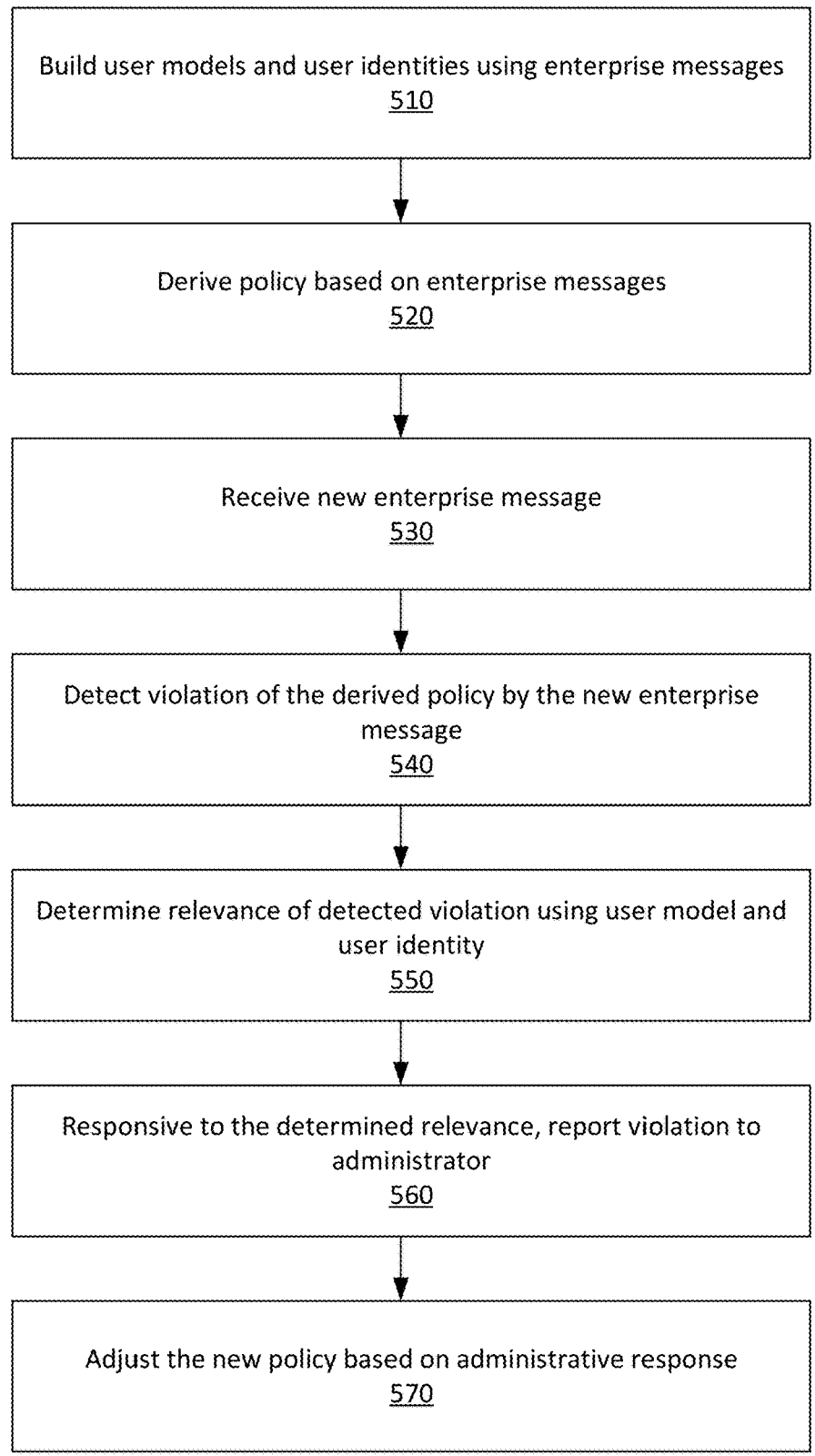
FIG. 5 illustrates a process for dynamic security policy handling, according to one embodiment.

FIG. 5 illustrates a process 500 for dynamic security policy handling, according to one embodiment. The cloud security service 120 builds 510 user models for users of an enterprise 110 using enterprise messages from the users. This may additionally include building user identities. The cloud security service 120 derives 520 one or more policies using the user models, user identities, and/or other analysis of the enterprise message. For example, based upon the contents of the archived enterprise messages, the cloud security service 120 explicitly or implicitly derives 520 one or more new policies for the users using the policy generation module 130.

The cloud security service 120 receives 530 a new enterprise message. For example, a sending user from enterprise 110B sends the new enterprise message to a receiving user at enterprise 110A. Enterprise 110A and enterprise 110B may not have communicated before and the sending user and receiving user may not be verified for one another. The cloud security service 120 evaluates the new enterprise message to detect 540 a violation. For example, the cloud security service 120 uses the policy enforcement module 130 to evaluate the received enterprise message. The cloud security service 120 may identify a purported sending user of the enterprise message and retrieve the purported sending user's user models and user identity. The cloud security service 120 may then evaluate the enterprise message using the user models and compare the output of the evaluation to the user identity, where more than a threshold amount of difference in the comparison indicates a violation. The cloud security service 120 may also or alternatively check if the enterprise message explicitly breaks the rules of one or more policies. The cloud security service 120 detects 540 a violation of the new policy.

The cloud security service 120 determines 550 a relevance of the violation. For example, the cloud security service 120 may determine 550 a score for the violation based at least in part on the user models and the user identity. If the score exceeds a threshold, the cloud security service 120 performs a security action, e.g. blocking the enterprise message and/or reporting the enterprise message to the administrative manager 114. In an embodiment, the cloud security service 120 adjusts 570 the new policy based on an administrative response received in response to the reporting of the enterprise message.

Figure 6:
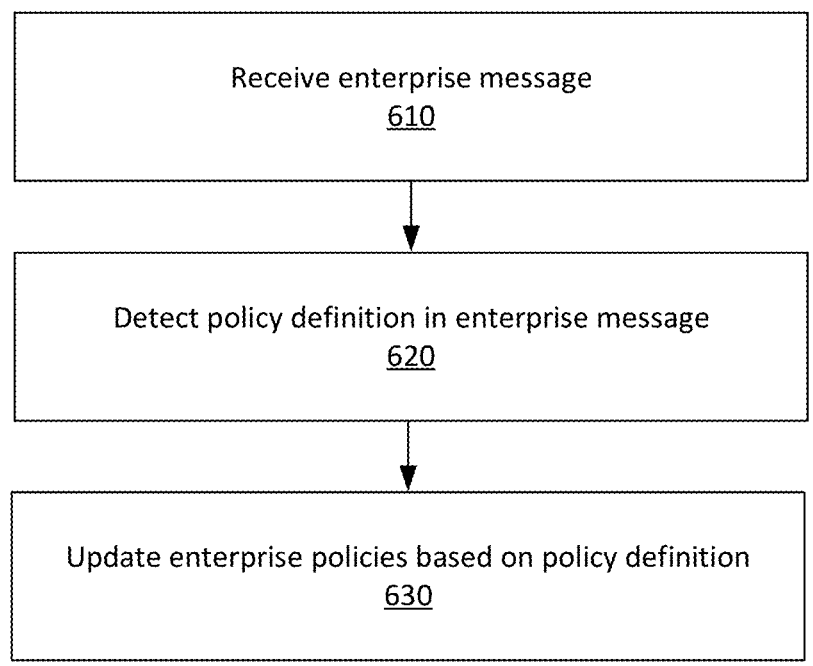
FIG. 6 illustrates a process for updating enterprise security policies, according to one embodiment.

FIG. 6 illustrates a process 600 for updating enterprise security policies, according to one embodiment. The cloud security service 120 receives 610 an enterprise message. The enterprise message may be an enterprise message sent from a sending user at enterprise 110A to a receiving user at enterprise 110C, where enterprise 110A uses the cloud security service 120 for data loss prevention. As such, enterprise 110A may send the received 610 enterprise message to the cloud security service 120 for review.

The cloud security service 120 detects 620 an explicit policy definition in the enterprise message. For example, when analyzing the enterprise message, the cloud security service 120 detects 620 a keyword or other text string in the enterprise message, or some other trigger for explicit policy definition. Alternatively, the cloud security service 120 may detect 620 the explicit policy definition by receiving the enterprise message at a policy definition address.

The cloud security service 120 updates 630 the enterprise's 110A policies based on the explicit policy definition. For example, the cloud security service 120 may modify an existing policy or create a new policy based on the contents of the enterprise message. The cloud security service 120 may generate one or more new policies based on the contents of the enterprise message. In an embodiment, the generated one or more new policies are sent to the enterprise 110A for review, and the cloud security service 120 updates the enterprise's 110A policies based on an administrative response.

Figure 7:
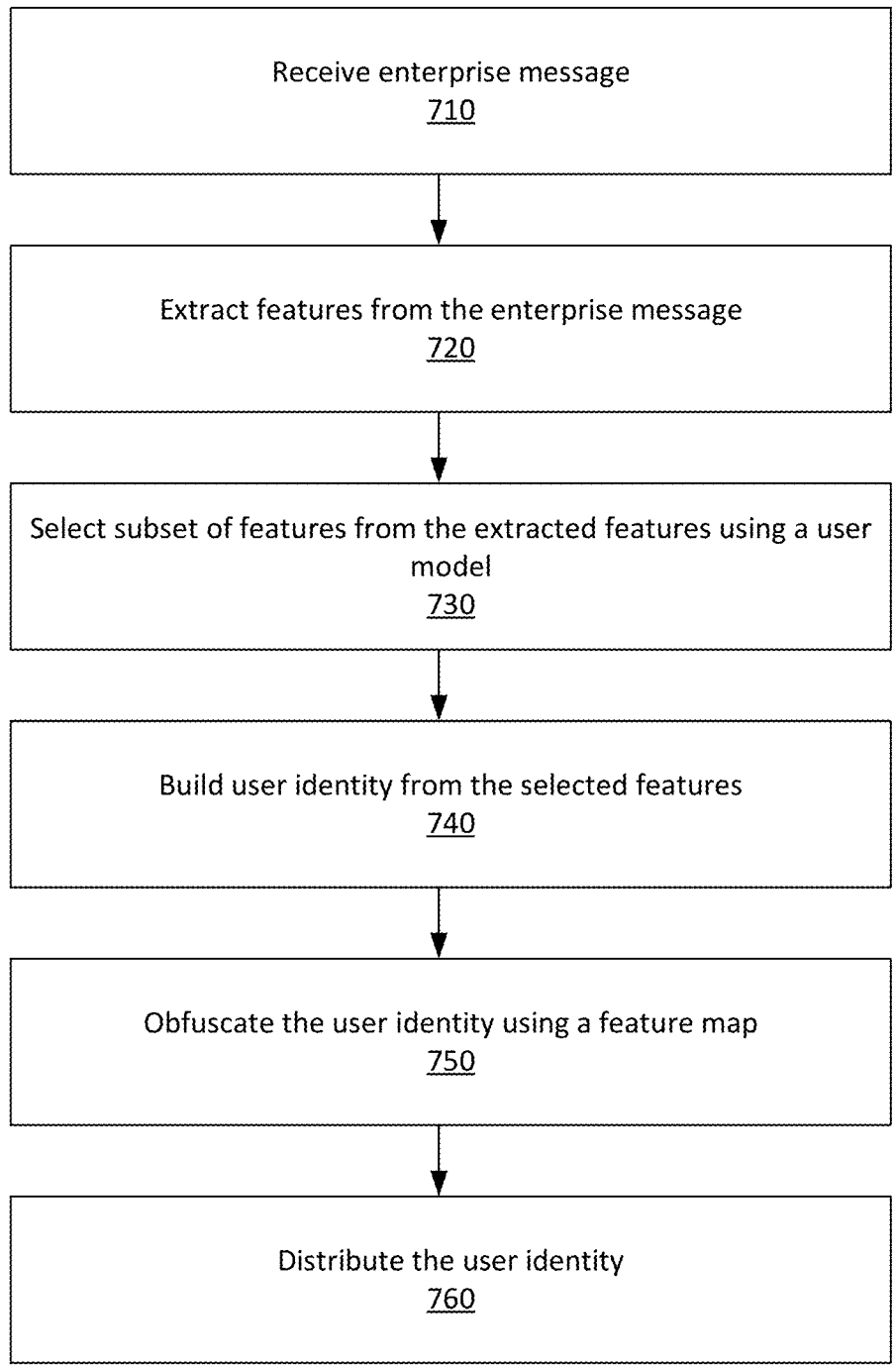
FIG. 7 illustrates a process for sharing identities, according to one embodiment.

FIG. 7 illustrates a process 700 for sharing identities, according to one embodiment. The cloud security service 120 receives 710 an enterprise message. The enterprise message may be an enterprise message sent from a sending user at enterprise 110C to a receiving user at enterprise 110A, where enterprise 110A uses the cloud security service 120 for data loss prevention. As such, enterprise 110A may send the received 710 enterprise message to the cloud security service 120 for review. In an embodiment, the received 710 enterprise message is an enterprise message set of some or all historic enterprise messages sent by the sending user.

The cloud security service 120 extracts 720 features from the enterprise message or enterprise message set. This may involve natural language processing to analyze each enterprise message for keywords, context, and so on. The cloud security service 120 generates a user model based on the extracted features and uses the user model to select 730 a subset of the extracted 720 features. For example, the subset may be the prominent features from the overall set of extracted 730 features.

The cloud security service 120 builds 740 a user identity based on the selected 730 features for the sending user of the enterprise message. Depending upon the embodiment, this may entail obfuscating 750 the user identity with a feature map.

The cloud security service 120 distributes 760 the user identity to the store 128. In an embodiment, this involves distributing the user identity to the shared ledger and distributing a non-feature mapped version of the user identity to the private ledger of the enterprise 110 associated with the sending user. The cloud security service 120 may also distribute the feature map with the user identity.

Figure 8:
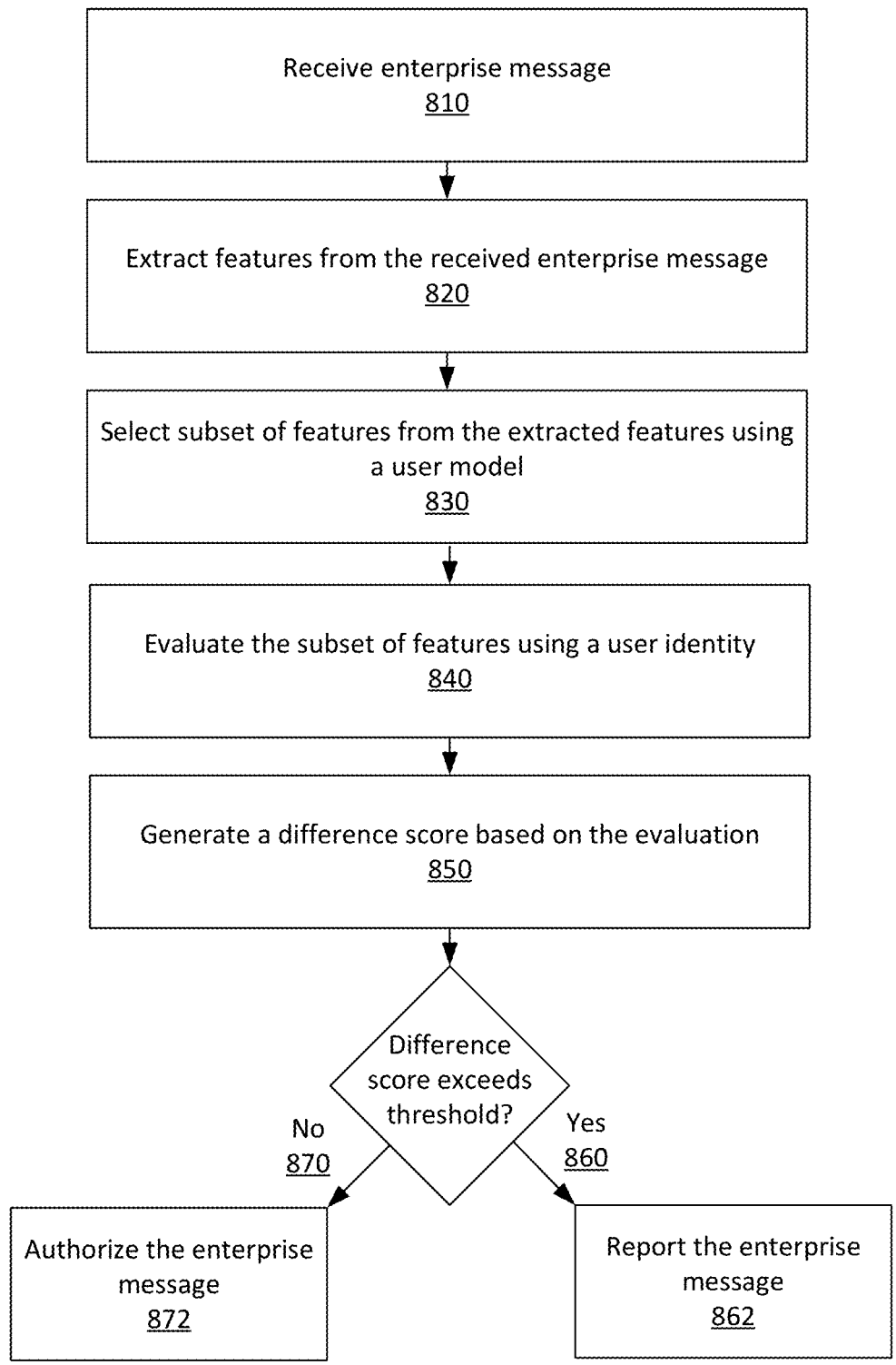
FIG. 8 illustrates a process for dynamic data loss prevention, according to one embodiment.

FIG. 8 illustrates a process 800 for dynamic data loss prevention, according to one embodiment. The cloud security service 120 receives 810 an enterprise message. The enterprise message may be an enterprise message sent from a purported sending user at enterprise 110C to a receiving user at enterprise 110A, where enterprise 110A uses the cloud security service 120 for data loss prevention. As such, enterprise 110A may send the received 810 enterprise message to the cloud security service 120 for review.

The cloud security service 120 extracts 820 features from the received 810 enterprise message, similar to extraction 720. The cloud security service 120 selects 830 a subset of features from the extracted 820 features using user models.

Using the user models, the cloud security service 120 selects 830 the features of the enterprise message that correspond to the prominent features of the sending user.

The cloud security service 120 evaluates 840 the subset of features using a user identity and associated feature map of the purported sending user. For example, the cloud security service 120 may pass the subset of features into the feature map and determine a difference between each prominent feature of the user identity and its counterpart from the enterprise message. The cloud security service 120 generates a difference score 850 based on the evaluation.

If the difference score exceeds 860 a threshold, the cloud security service 120 reports 862 the enterprise message or performs a different security action. If the difference score does not exceed 870 the threshold, the cloud security service 120 authorizes 872 the enterprise message, allowing it to pass to the receiving user. By verifying the purported sending user as the actual sending user, rather than a malevolent entity posing as the sending user, the cloud security service 120 provides data loss prevention, protecting the enterprise 110A against phishing attacks and other enterprise message-based attacks.

III. Computing Environment

Figure 9:
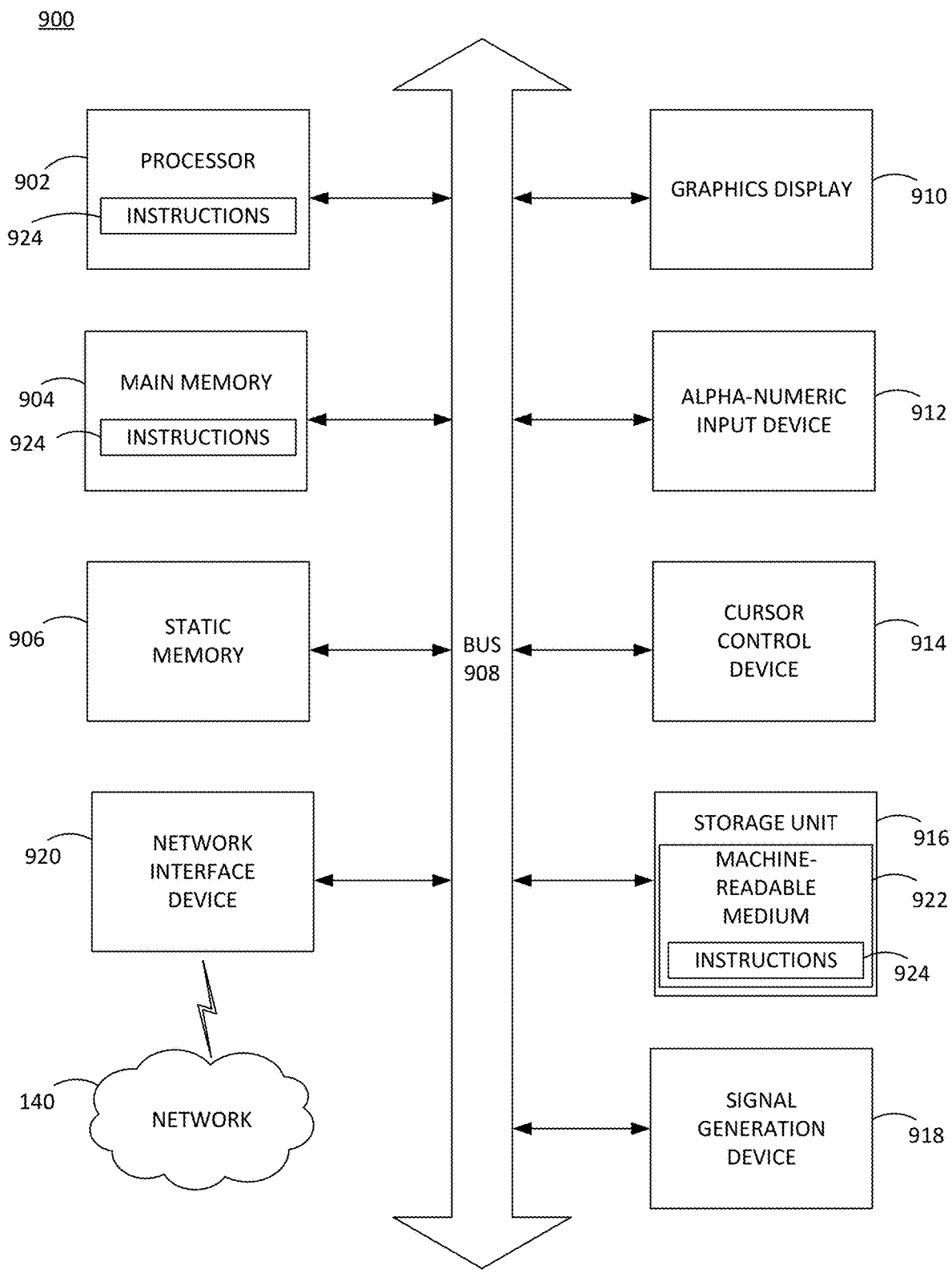
FIG. 9 is a block diagram illustrating components of an example machine able to read instructions from a machine readable medium and execute them in a processor or controller, according to one embodiment.

FIG. 9 is a block diagram illustrating components of an example machine able to read instructions from a machine readable medium and execute them in a processor or controller, according to one embodiment. Specifically, FIG. 9 shows a diagrammatic representation of a machine in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an interne of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system 900 may include a storage unit 916. The processor 902, memory 904 and the storage unit 916 communicate via a bus 908.

In addition, the computer system 900 can include a static memory 906, a display driver 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

IV. Additional Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of providing network security, comprising:
  receiving, via a computer network, an electronic message sent by a sending user of an enterprise to a receiving user;
  retrieving, from a data store, a machine-learned user model:
    specific to the sending user,
    trained with a set of electronic messages previously sent by the sending user to the receiving user, and
    describing linguistic features of the set of electronic messages previously sent by the sending user;
  retrieving a user identity for the sending user, the user identity representing a set of prominent features:
    of electronic messages previously sent by the sending user,
    obfuscated via a feature map to form the user identity, and
    comprising a first feature value, of a first feature type, differing from an average value of the first feature type by greater than a threshold value, wherein the feature map is set for a particular level of obfuscation and distinct from a second feature map associated with a second user identity;
  applying the electronic message to the machine-learned user model to produce a set of message features; and detecting a difference between the set of message features, produced by the machine-learned user model, and the user identity; and based on the difference:

determining that the electronic message violates a security policy of the enterprise; and performing a security action based on the determination that the electronic message violates the security policy.

2. The method of claim 1, wherein determining that the electronic message violates the security policy comprises determining that the electronic message violates the security policy responsive to the difference indicating nonconformity of the electronic message with other electronic messages sent by the sending user.

3. The method of claim 1:

further comprising reading a purported identity of the sending user from the electronic message; and wherein retrieving the machine-learned user model from the data store comprises retrieving the machine-learned user model describing electronic messaging behavior associated with the purported identity.

4. The method of claim 1, further comprising:

detecting a trigger within the electronic message, the trigger indicating a new security policy for the enterprise based on the electronic message, the new security policy comprising a restriction upon users permitted to send electronic messages containing particular content;

detecting a set of parameters of the new security policy related to the restriction upon users and the particular content in the electronic message;

creating the new security policy based on the set of parameters; and saving the new security policy to the data store.

5. The method of claim 1, wherein performing the security action comprises:

generating a score indicating severity of the electronic message, the score indicating a risk to the enterprise associated with a security policy violation by the electronic message;

reporting the security policy violation to an administrator of the enterprise; and receiving, from the administrator, an indication of the security action to perform on the electronic message.

6. The system of claim 1, further comprising:

accessing the set of electronic messages previously sent by the sending user;

detecting the set of prominent features, representative and distinctive of communication behavior of the sending user, from electronic messages, in the set of electronic messages, previously sent by the sending user to the receiving user; and applying a privacy-preserving one-way hash to the set of prominent features to generate the user identity for the sending user.

7. The system of claim 1, further comprising:

accessing the set of electronic messages previously sent by the sending user;

detecting the first feature value, of the feature type, differing from the average value of the first feature type for a population of users by greater than the threshold value;

storing the first feature value, of the feature type, in the set of prominent features for the sending user; and representing the set of prominent features in the user identity for the sending user.

8. A non-transitory computer-readable storage medium storing computer program instructions executable by a processor device to perform operations for providing network security, the operations comprising:

receiving, via a computer network, an electronic message sent by a sending user of an enterprise to a receiving user;

retrieving, from a data store, a user model:

specific to the sending user, trained with a set of electronic messages previously sent by the sending user to the receiving user, and describing linguistic features of the set of electronic messages previously sent by the sending user;

retrieving a user identity for the sending user, the user identity representing a set of prominent features;

of electronic messages previously sent by the sending user, obfuscated via a feature map to form the user identity, and comprising a first feature value, of a first feature type, differing from an average value of the first feature type by greater than a threshold value, wherein the feature map is set for a particular level of obfuscation and distinct from a second feature map associated with a second user identity;

applying the electronic message to the user model to produce a set of message features; and detecting a difference between the set of message features, produced by the user model, and the user identity; and based on the difference:

determining that the electronic message violates a security policy of the enterprise; and performing a security action based on the determination that the electronic message violates the security policy.

9. The non-transitory computer-readable storage medium of claim 8, wherein determining that the electronic message violates the security policy comprises determining that the electronic message violates the security policy responsive to the difference indicating nonconformity of the electronic message with other electronic messages sent by the sending user.

10. The non-transitory computer-readable storage medium of claim 8:

further comprising reading a purported identity of the sending user from the electronic message; and wherein retrieving the user model from the data store comprises retrieving the user model describing electronic messaging behavior associated with the purported identity.

11. The non-transitory computer-readable storage medium of claim 8, the operations further comprising:

detecting a trigger within the electronic message, the trigger indicating a new security policy for the enterprise based on the electronic message, the new security policy comprising a restriction upon users permitted to send electronic messages containing particular content;

detecting a set of parameters of the new security policy related to the restriction upon users and the particular content in the electronic message;

creating the new security policy based on the set of parameters; and saving the new security policy to the data store.

12. The non-transitory computer-readable storage medium of claim 8, wherein performing the security action comprises:

generating a score indicating severity of the electronic message, the score indicating a risk to the enterprise associated with a security policy violation by the electronic message;

reporting the security policy violation to an administrator of the enterprise; and receiving, from the administrator, an indication of the security action to perform on the electronic message.

13. A system, comprising:

a processor device for executing computer program instructions; and a non-transitory computer-readable storage medium storing computer program instructions executable by the processor device to perform operations for providing network security, the operations comprising:

receiving, via a computer network, an electronic message sent by a sending user of an enterprise to a receiving user;

retrieving, from a data store, a user model:
  specific to the sending user,
  trained with a set of electronic messages previously sent by the sending user to the receiving user, and
  describing linguistic features of the set of electronic messages previously sent by the sending user;

retrieving a user identity for the sending user, the user identity representing a set of prominent features:
  of electronic messages previously sent by the sending user,
  obfuscated via a feature map to form the user identity, and
  comprising a first feature value, of a first feature type, differing from an average value of the first feature type by greater than a threshold value, wherein the feature map is set for a particular level of obfuscation and distinct from a second feature map associated with a second user identity;

applying the electronic message to the user model to produce a set of message features; and detecting a difference between the set of message features, produced by the user model, and the user identity; and based on the difference:
  determining that the electronic message violates a security policy of the enterprise; and
  performing a security action based on the determination that the electronic message violates the security policy.

14. The system of claim 13, wherein determining that the electronic message violates the security policy comprises determining that the electronic message violates the security policy responsive to the difference indicating nonconformity of the electronic message with other electronic messages sent by the sending user.

15. The system of claim 13:
further comprising reading a purported identity of the sending user from the electronic message; and
wherein retrieving the user model from the data store comprises retrieving the user model describing electronic messaging behavior associated with the purported identity.

16. The system of claim 12, the operations further comprising:
detecting a trigger within the electronic message, the trigger indicating a new security policy for the enterprise based on the electronic message, the new security policy comprising a restriction upon users permitted to send electronic messages containing particular content;
detecting a set of parameters of the new security policy related to the restriction upon users and the particular content in the electronic message;
creating the new security policy based on the set of parameters; and
saving the new security policy to the data store.

17. The system of claim 13, wherein performing the security action comprises:
generating a score indicating severity of the electronic message, the score indicating a risk to the enterprise associated with a security policy violation by the electronic message;
reporting the security policy violation to an administrator of the enterprise; and
receiving, from the administrator, an indication of the security action to perform on the electronic message.

\* \* \* \* \*